Sept. 14, 1937.   H. KLAYF   2,092,923

LENS ATTACHING STUD FOR RIMLESS SPECTACLES AND EYEGLASSES

Filed May 20, 1936

Inventor
Hyman Klayf
Benj. J. Porterhouse Atty

Patented Sept. 14, 1937

2,092,923

UNITED STATES PATENT OFFICE 2,092,923

LENS ATTACHING STUD FOR RIMLESS SPECTACLES AND EYEGLASSES

Hyman Klayf, Chicago, Ill.

Application May 20, 1936, Serial No. 80,659

4 Claims. (Cl. 88—47)

My present invention relates to improvements in lens attaching studs for rimless spectacles and eyeglasses. Such studs consist of the pillar to which the temple is pivoted or the bridge is secured, as the case may be. From the opposite end of the stud to which the temple is pivoted or the bridge secured extends a pair of perforated, parallel ears which are adapted to lie upon opposite faces of the lens and through the perforations in which, and a perforation provided in the lens, passes a securing screw. Also located between the above described ears is a member extending laterally with respect to the ears against which is seated the edge of the lens. The face contacting ears have to be formed to conform with the particular lens with which they are associated, and I have found, generally, that it is highly desirable, and in some cases necessary, to so provide and mount the edge contacting portion whereby it may be given divers angles both vertical and horizontal with respect to the stud and with respect to the ears or face contacting elements without disturbing the form or adjustment of these latter elements.

I have sought and accomplished the above stated general object by means of a structure forming the subject matter of an application for United States Letters Patent heretofore filed by me April 9, 1936 and given Serial No. 73,473. The subject matter of the present application is for the accomplishment of the same general purposes but as will be hereafter seen, I have employed a different structure and arrangement in so doing.

As a further object of the present invention I have provided the edge contacting element with a separate and separable piece which may be made of spring steel or a special preparation of considerably more elasticity and springiness than can be given to gold or silver or other metals from which eyeglasses and spectacle fittings are generally made. The presence of this separable spring piece in a lens stud prevents the elements of the spectacle or eyeglass from working loose and developing play.

I have accomplished the foregoing objects by means of the structure illustrated in the accompanying drawing, in which—

Similar reference characters refer to similar parts throughout the respective views.

Figure 1:
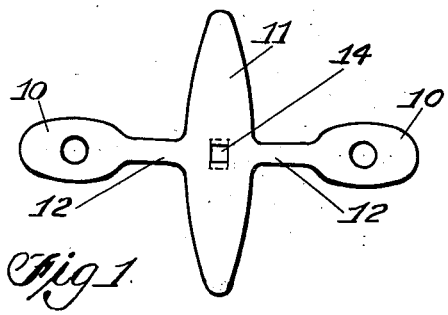
Fig. 1 is a development of a blank for forming the face contacting ears and the edge contacting member of a stud integrally.
Figure 2:
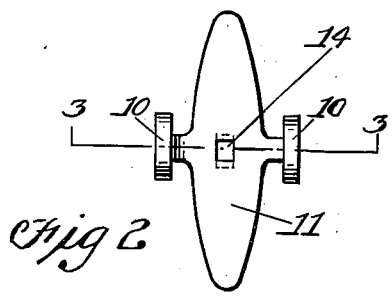
Fig. 2 is a view looking between the face contacting ears, when these ears have been brought into parallel relation, and showing the edge contacting element in elevation.
Figure 3:
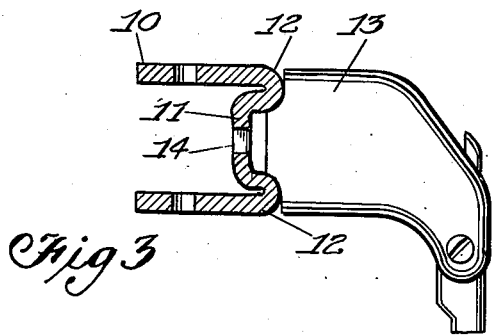
Fig. 3 is a detail of a stud showing the face contacting ears and edge contacting element in horizontal section on line 3—3 of Fig. 2.
Figure 4:
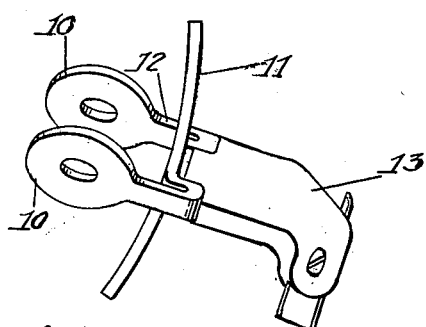
Fig. 4 is a perspective detail of the structure shown in Fig. 3.
Figure 8:
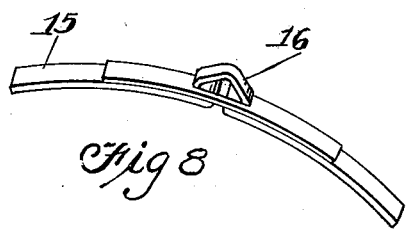
Fig. 8 is a perspective detail of the detached spring element which may be associated with the edge contacting portion.

As most clearly shown in Fig. 1 it is easily possible to form the face contacting ears 10—10 and edge contacting portion 11 integrally by a single stamping operation, the ears 10 being located laterally with respect to the portion 11 and connected therewith by means of the relatively long straps 12—12. These straps 12—12 are sufficiently long so that when the ears 10—10 are brought in parallel relation, as shown in Figs. 2, 3, and 4, the straps may be bent so as to space the edge contacting piece 11 a sufficient distance away from the stud or stem 13 to permit of the angling of the portion 11 with respect to the portions 10 and 13. The bent central portions of the straps 12—12 are secured to the stem 13 by solder or brazing or in any desired way.

Figure 5:
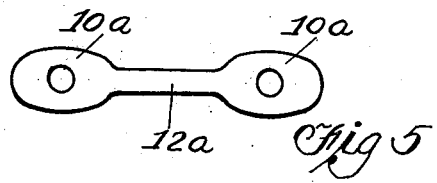
Fig. 5 is a blank for forming the lens face contacting ears integrally but separately from the edge contacting portion.
Figure 6:
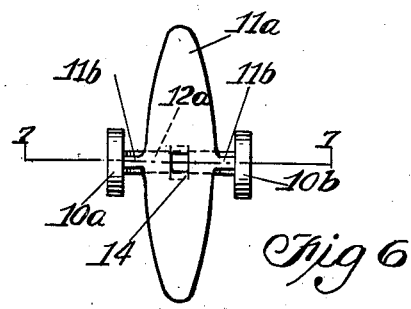
Fig. 6 is a view similar to Fig. 2 in which the edge contacting piece is provided with opposite lateral extensions which are soldered between the necks of the face contacting ears at a sufficient distance from the pillar or stud to permit of the independent angling of the edge contacting portion.
Figure 7:
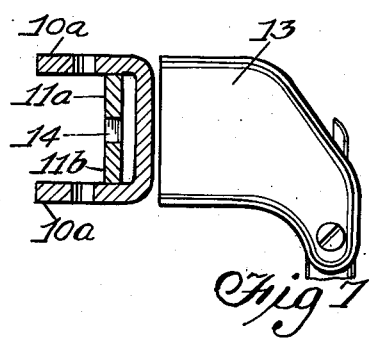
Fig. 7 is a view similar in all respects to Fig. 3 except the section is taken from the modified form shown in Fig. 6 on line 7—7.

In the modified form shown in Figs. 5, 6, and 7 the strap 12a which connects the ears 10a—10a need not be as long as the combined length of the straps 12—12, as the edge contacting portion 11a is blanked out separately from the ears and is provided with lateral extensions 11b—11b which are soldered between parallel portions of the strap 12a a sufficient distance from the bottom of the U to permit of the necessary angling, as shown in Fig. 7.

It will be noticed from an examination of Figs. 1, 2, and 6 that a preferably rectangular perforation 14 is provided in the center of the edge contacting portion 11. The top and bottom edges of the perforation 14 are preferably undercut. For co-operation with the perforation 14 I provide the spring 15, the central portion whereof is provided with a laterally extending loop 16, which, when pressed, will snap into perforation 14, thereby permitting the spring piece to be dispensed with or added in a perticular case with very little additional work or expense.

Having described my invention what I claim is new and desire to secure by Letters Patent is:

1. A lens attaching stud for rimless spectacles and eyeglasses comprising a stem or stud, and an integrally formed member having, parellelly disposed lens face contacting ears, connected by a strap and, a lens edge contacting portion extending laterally from an intermediate point of said strap, said strap being bent upon itself at points between the ears and the edge contacting member and the bent ends secured to the stud or stem so as to hold the edge contacting part spaced from the end of the stem or stud.

2. In a lens attaching stud for rimless spectacles and eyeglasses consisting of a stem or stud adapted to be connected with a temple or a bridge, parallel lens face contacting ears extending from one end of said stud and a lens edge contacting piece, said lens edge contacting piece having intermediate lateral extensions joined with said face contacting ears at the bases thereof and being in spaced relation to the end of said stem or stud.

3. In a lens attaching stud for rimless spectacles and eyeglasses consisting of a stem or stud adapted to be connected with a temple or a bridge, parallel lens face contacting ears extending from one end of said stud, a lens edge contacting piece joined to the bases of said face contacting ears in spaced relation with the end of said stud, said lens edge contacting piece being provided with a rectangular central perforation with undercut edges and a member formed of spring material and having a laterally extending loop adapted to enter and co-operate with the perforation in said edge contacting piece.

4. In a lens attaching stud for rimless spectacles and eyeglasses consisting of a stem or stud adapted to be connected with a temple or a bridge, parallel lens face contacting ears extending from one end of said stud, a lens edge contacting piece joined to the bases of said face contacting ears in spaced relation with the end of said stud, said lens edge contacting piece being provided with a rectangular central perforation, and a member formed of spring material and having a laterally extending loop adapted to enter and co-operate with the perforation in said edge contacting piece.

HYMAN KLAYF.